UNITED STATES PATENT OFFICE.

CARLETON B. HUTCHINS, OF ANN ARBOR, MICHIGAN.

IMPROVEMENT IN THE MANUFACTURE OF POTATO STARCH.

Specification forming part of Letters Patent No. 116,597, dated July 4, 1871.

*To all whom it may concern:*

Be it known that I, CARLETON B. HUTCHINS, of Ann Arbor, county of Washtenaw and State of Michigan, have invented an improved process for separating potato starch from the pomace after the potatoes have been grated, of which the following is a specification:

Convey the pomace, after the same has been run over the sieve or direct from the grater, into a tub or vat, keep the pomace constantly agitated with a stirrer, and draw the pomace into press-tubs lined up with canvas; place on a follower, and subject the same to a heavy pressure, which will carry out all the remaining starch with the water. This mode will produce a much greater yield of starch than the old process.

The pomace comes out of the tubs in cakes, which renders it in a suitable condition to be shipped and used in the manufacture of paper, leather boards, &c.

The present way of separating the starch from the pomace is to pass it over a sieve and use a large quantity of water to rinse the starch out of the pomace and through the sieve. These sieves are very liable to gum up and carry the starch into the streams with the pomace. The starch in the potato is contained in sacks or cells in a liquid state. The pressing process serves to break all these sacks and force out all the starch either from the sacks or what may escape in the rinsing process, and thus secure all the starch which the potato may contain.

The average yield of starch to the bushel of sixty pounds is eight pounds, as secured by the old process. An increase of two or more pounds to each bushel is secured by taking the same pomace, after it has been rinsed over the sieve, and subject the same to a pressure, as before named.

There are two hundred and fifty thousand bushels of potatoes worked up into starch annually in the States of New York, Vermont, New Hampshire, and Maine.

I do not claim any particular kind of press or rollers which may be used with success in separating the starch from the pomace.

I claim as my invention—

The process of separating the starch from the pomace by a pressure either before or after the pomace has been rinsed over the sieve, substantially as set forth in the foregoing specification.

CARLETON B. HUTCHINS.

Witnesses:
E. R. HUTCHINS,
H. B. HUTCHINS.